(12) United States Patent
Pettersson

(10) Patent No.: US 12,172,411 B2
(45) Date of Patent: *Dec. 24, 2024

(54) HOLLOW BOARD

(71) Applicant: IKEA SUPPLY AG, Pratteln (CH)

(72) Inventor: Dan Pettersson, Ljungby (SE)

(73) Assignee: IKEA SUPPLY AG, Pratteln (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,733

(22) Filed: May 23, 2023

(65) Prior Publication Data

US 2023/0405977 A1 Dec. 21, 2023

Related U.S. Application Data

(63) Continuation of application No. 17/537,079, filed on Nov. 29, 2021, now Pat. No. 11,691,393, which is a
(Continued)

(30) Foreign Application Priority Data

Jun. 27, 2016 (SE) .................................... 1650917-6

(51) Int. Cl.
*B32B 3/10* (2006.01)
*A47B 96/20* (2006.01)
(Continued)

(52) U.S. Cl.
CPC ............ *B32B 21/02* (2013.01); *A47B 96/205* (2013.01); *B27N 3/00* (2013.01); *B27N 3/002* (2013.01);
(Continued)

(58) Field of Classification Search
None
See application file for complete search history.

(56) References Cited

U.S. PATENT DOCUMENTS

| 2,073,896 A | 3/1937 | Loetscher |
| 2,236,948 A | 4/1941 | Maurer |
| (Continued) | | |

FOREIGN PATENT DOCUMENTS

| CN | 102459382 A | 5/2012 |
| CN | 103415390 A | 11/2013 |
| (Continued) | | |

OTHER PUBLICATIONS

Machine translation of EP-2525010-A1 (Year: 2012).*
(Continued)

*Primary Examiner* — Christopher M Polley
(74) *Attorney, Agent, or Firm* — Merchant & Gould P.C.

(57) ABSTRACT

The present disclosure relates to a hollow board 1 with first and second main surface layers 3, 5. A plurality of distance elements connecting the first and second main surface layers and maintain a predetermined distance there between. The main surface layers include at least a layer of high-density fiber, HDF, board, and a plurality of distance elements are distributed in the space between the main surface layers, and at least some comprise at least one elongate HDF board strip 15 which is oriented such that its longitudinal edges interconnect the first and second main surface layers 3, 5. The HDF boards of the surface layers and of the at least some of the distance elements comprise wood particles bonded by a resin including an isocyanate, such as methylene diphenyl di-isocyanate, MDI.

23 Claims, 2 Drawing Sheets

Related U.S. Application Data continuation of application No. 16/313,453, filed as application No. PCT/SE2017/050700 on Jun. 26, 2017, now Pat. No. 11,247,438.

(51) Int. Cl.

| | |
|---|---|
| *B27N 3/00* | (2006.01) |
| *B27N 5/02* | (2006.01) |
| *B32B 3/18* | (2006.01) |
| *B32B 7/12* | (2006.01) |
| *B32B 7/14* | (2006.01) |
| *B32B 15/10* | (2006.01) |
| *B32B 21/02* | (2006.01) |
| *B32B 21/08* | (2006.01) |
| *B32B 21/13* | (2006.01) |
| *B32B 21/14* | (2006.01) |
| *B32B 27/32* | (2006.01) |
| *B32B 37/12* | (2006.01) |
| *E04C 2/36* | (2006.01) |
| *E06B 3/70* | (2006.01) |

(52) U.S. Cl.
CPC ............... *B27N 5/02* (2013.01); *B32B 3/18* (2013.01); *B32B 7/12* (2013.01); *B32B 7/14* (2013.01); *B32B 15/10* (2013.01); *B32B 21/08* (2013.01); *B32B 21/13* (2013.01); *B32B 21/14* (2013.01); *B32B 27/32* (2013.01); *B32B 37/1207* (2013.01); *E04C 2/36* (2013.01); *E06B 3/7015* (2013.01); *B32B 2037/1215* (2013.01); *B32B 2260/026* (2013.01); *B32B 2260/046* (2013.01); *B32B 2262/06* (2013.01); *B32B 2262/067* (2013.01); *B32B 2307/558* (2013.01); *B32B 2307/72* (2013.01); *B32B 2307/7265* (2013.01); *B32B 2307/732* (2013.01); *B32B 2479/00* (2013.01); *B32B 2607/00* (2013.01); *E06B 2003/7021* (2013.01)

(56) References Cited

U.S. PATENT DOCUMENTS

| | | |
|---|---|---|
| 8,935,899 B2 | 1/2015 | Bergelin et al. |
| 2011/0073253 A1 | 3/2011 | Clausi et al. |
| 2012/0047839 A1 | 3/2012 | Walker |
| 2013/0333839 A1* | 12/2013 | Pettersson ............ B31D 3/0284 156/578 |
| 2014/0364557 A1 | 12/2014 | Holvoet et al. |
| 2016/0185967 A1 | 6/2016 | Jing |

FOREIGN PATENT DOCUMENTS

| | | | |
|---|---|---|---|
| EP | 2525010 A1 * | 11/2012 | ........... A47B 96/205 |
| EP | 2627503 A1 | 8/2013 | |
| EP | 2627503 B1 | 6/2014 | |
| SE | 539656 C2 | 10/2017 | |
| WO | 2010/006409 A1 | 1/2010 | |
| WO | 2010/019666 A1 | 2/2010 | |
| WO | 2010/049418 A1 | 5/2010 | |
| WO | 2010/147936 A1 | 12/2010 | |
| WO | 2011/059980 A1 | 5/2011 | |
| WO | 2014/107767 A1 | 7/2014 | |

OTHER PUBLICATIONS

Step and wall https://www.stepandwall.com/en/floorever-blog/floorever-blog-decor-tips-interior-desing-and-inspiration/36-what-is-high-density-fiberboard-or-hdf#:~:text=The%20density%20or%20weight%20of,500%2D600%20kg%2Fm3. (Year: 2023).*
Nicewicz, D et al., "Improving the properties of HDF boards for use in humid conditions", Annals of Warsaw University of Life Sciences—SGGW, Forestry ad Wood Technology No. 88: 170-173 (2014).
Swedish Search Report for SE Application No. 1650917-6 mailed Jan. 26, 2017 (3 pages).
International Search Report and Written Opinion for PCT/SE2017/050700 mailed Sep. 14, 2017.
International Preliminary Report on Patentability for PCT/SE2017/050700 mailed Oct. 22, 2018.
European Search Report for EP Application No. 17820648.8 mailed Jan. 8, 2020 (7 pages).
Chinese Office Action for CN Application No. 201780039846.8 mailed May 11, 2020 (18 pages) (English Translation).

* cited by examiner

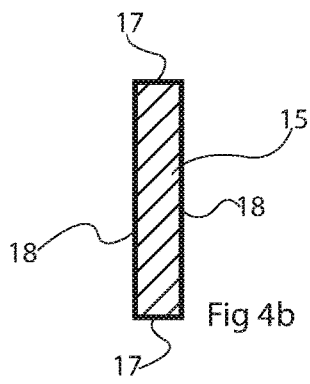
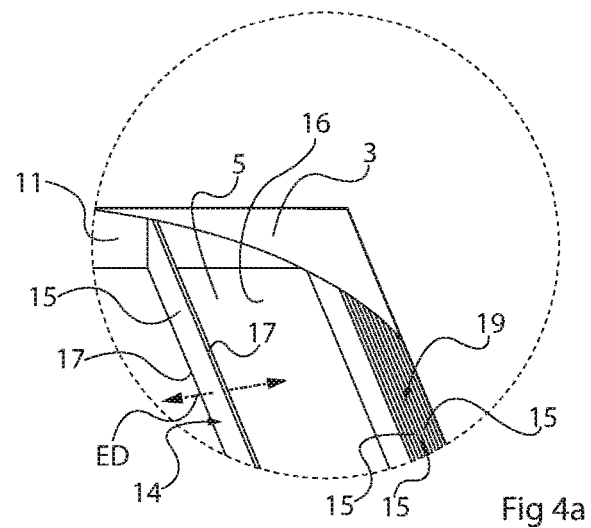
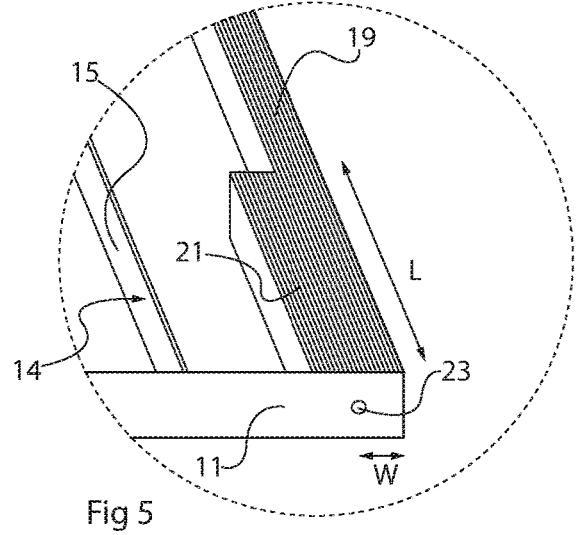
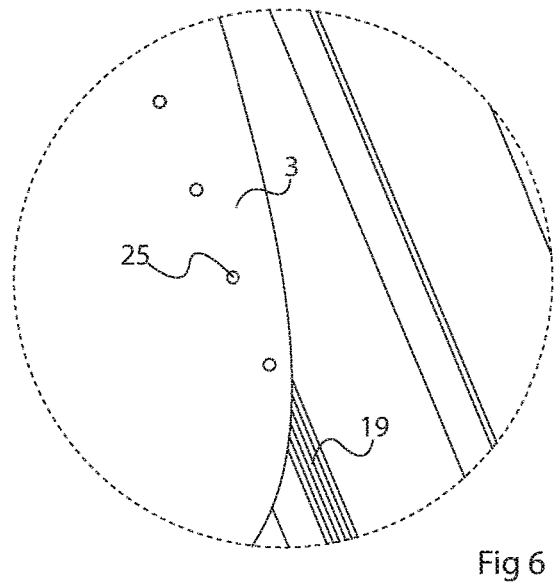
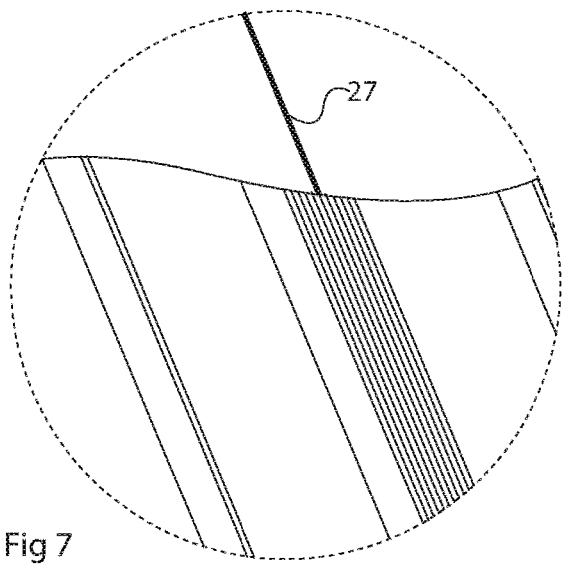
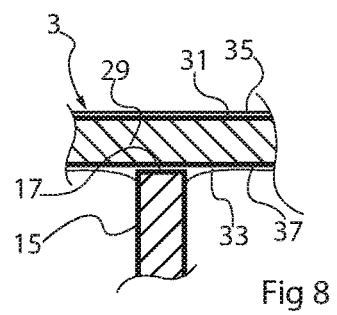

HOLLOW BOARD

CROSS-REFERENCE TO RELATED APPLICATIONS

This application is a continuation of U.S. Application No. 17,537,079 filed on Nov. 29, 2021, which is a continuation of U.S. application Ser. No. 16/313,453, filed 26 Dec. 2018, that granted as U.S. Pat. No. 11,247,438 on Feb. 15, 2022, which is a National Stage Application of PCT/SE2017/050700, filed 26 Jun. 2017, which claims the benefit of priority to Swedish Patent Application No. 1650917-6, filed 27 Jun. 2016, which applications are incorporated herein by reference. To the extent appropriate, a claim of priority is made to each of the above disclosed applications.

TECHNICAL FIELD

The present disclosure relates to a hollow board, comprising first and second surface layers and a plurality of distance elements connecting the first and second surface layers and maintaining a predetermined distance between the first and second surface layers.

BACKGROUND

Such a board is disclosed for instance in WO-2010/049418-A1, describing a board making up a furniture element with first and second main sides. The board has a supporting structure comprising a number of longitudinal bodies and a hollow distance material placed in between the longitudinal bodies. The longitudinal members may consist of wood or a board material, and a honeycomb cardboard may constitute the distance material. A board material which may be laminated with a foil is adapted to be folded over and glued on the supporting structure to provide the surface layers of the first and second sides as well as one or more of the board edge surfaces. When the board is finished the support structure maintains a predetermined distance between the surface layers of the first and second sides, and the board thereby has a considerable bending stiffness despite being very light.

A general problem in this technical field is how to provide an improved board. An improvement may mean a board that is one or more of lighter, stronger, less expensive to produce, having an improved capability of being used in a broad range of working environments, or having a lesser environmental impact.

SUMMARY

One object of the present disclosure is thus to provide an improved hollow board. This object is achieved by means of a hollow board as defined in claim 1. More specifically, in a board of the initially mentioned kind, each main surface layer may include at least a layer of fiberboard having a density of at least 800 kg/m$^3$ (HDF board), and a plurality of distance elements may be distributed in a space between the main surface layers. At least some of said plurality of distance elements comprises at least one elongate HDF board strip being oriented such that its longitudinal edges interconnect the first and second main surface layers. The HDF boards of the surface layers and at least some of said distance elements comprise wood particles bonded by a resin including an isocyanate component.

It has been found that by using a resin with an isocyanate component, rather than the typically used formaldehyde based resins, a hollow board that is less affected by changing humidity, in particular high humidity and high temperatures, can be achieved. This allows a board to be used all over the world, while retaining its form and strength. By arranging the distance element board strips such that their longitudinal edges interconnect the main surface layers, this effect is enhanced. Any swelling that may still take place in the strip will to a great extent occur in the direction that the strip material was pressed, and this does not affect its function as a distance element. For instance, it can be avoided that the swelling of the board strip cracks a surface layer on the side edge surfaces of the hollow board.

The HDF board strip may extend in a plane perpendicular to the plane of the first and second main surface layers. This provides a local I-beam which entails a hollow board with high bending stiffness about an axis perpendicular to the direction in which the board strip extends. The hollow board may therefore have a main direction of extension and the HDF board strip an elongate direction being parallel with the main direction of extension.

The HDF board strip longitudinal edges, that interconnect the main surface layers, may be cut edges formed by cutting the strip from a HDF board. The strip side faces/edges being perpendicular to the longitudinal edges may have a smoother surfaces than the cut longitudinal edges, preferably the strip side edges may be press formed side edges. The rougher cut longitudinal edges are well suited for being glued to the main surface layers.

The HDF board strip may extend along at least 80%, preferably at least 90%, of the total length of the board in the main direction of extension, thus providing a very strong board.

The plurality of distance elements may include at least one stack of glued together HDF board strips, wherein the stack is oriented in between the first and second surface layers such that individual board strips in the stack interconnect the first and second surface layers. This provides the same advantages of mainly swelling in a direction that does not affect the hollow board structure as does the single HDF board strip, but also a wider piece that may allow the use of connector elements. Typically, the stack of glued together HDF board strips may comprise 3-10 individual HDF board strips. This provides a suitable thickness of the stack, to provide extra strength thereof.

A stack may adjoin a side edge of the board. An advantage of this embodiment is that the stack reinforces the side edge of the board and makes it more resistant to impacts etc.

Preferably the stack may have a length (L) of less than 20% of the total length of the board. This reduces the weight of the board, in particular in applications where the stack is needed mainly for local reinforcement of the board.

Preferably the stack may have a width (W) of less than 20% of the total width of the board. This reduces the weight of the board, in particular in applications where the stack is needed mainly for local reinforcement, and/or is needed for side edge reinforcement of the board.

At least one connector element may be machined in the hollow board at the location of a block located between the first and second surface layers. This block could preferably be a stack of glued together HDF board strips. The at least one connector element extends at least partly into the block, for example the stack of glued together HDF board strips. The fact that the connector element is at least partly machined in the block, such as in a stack of glued together HDF strips, makes the connector element stronger and allows the hollow board for instance to be connected to other furniture components in a secure manner.

Preferably the at least one block has a length (L) constituting less than 20% of the total length of the hollow board. This provides for a block that is located locally where the connector element is needed, thereby not adding unnecessary weight to the board.

Preferably the at least one block has a width (W) constituting less than 20% of the total width of the hollow board. This too provides for a block that is located locally where the connector element is needed, thereby not adding unnecessary weight.

The stack of HDF board strips may be glued together using a polyurethane based reactive hotmelt glue.

Typically, the plurality of distance elements may include both at least one stack of glued HDF board strips and at least one distance element comprising a single HDF board strip, the latter being spaced apart from said at least one stack.

The first and second main surface layers and at least one side edge surface of the hollow board are preferably made from a single piece of HDF board. A method and an arrangement for folding a board to form first and second main surface layers is, for example, described in Swedish patent application No. SE 1550962-3. This, in addition to providing an efficient manufacturing procedure, verifies that the main surface layers always come from the same batch of HDF board, and thus have identical water content, etc., when being assembled into a hollow board. This provides an improved quality as the main surface layers will behave identically once being attached to each other with the distance elements therebetween.

The isocyanate component of the resin may comprise at least one component selected among methylene diphenyl di-isocyanate (MDI) and polymethylene polyphenylene isocyanate. These types of isocyanate components have proven very efficient for obtaining a hollow board with good humidity resistance. Preferably the resin comprises at least 30% of polymethylene polyphenylene isocyanate and/or methylene diphenyl di-isocyanate (MDI). This provides for further improved humidity resistance. Still more preferably the resin comprises a 4,4'-methylene diphenyl di-isocyanate isomer, and/or a polymethylene polyphenylene isocyanate that has been formed from a 4,4'-methylene diphenyl di-isocyanate isomer. The 4,4'-methylene diphenyl di-isocyanate isomer and polymers made therefrom are particularly efficient for forming strong and humidity resistant hollow boards.

The HDF board may comprise 0.5-15, more preferably 2-10, and most preferably 3-7, wt %, excluding any water, of resin containing the isocyanate component. In this context the "wt % of resin" is calculated excluding any water, for example excluding any water forming part of the resin formulation and excluding any water used to make an emulsion from the resin before mixing it with the wood fibers. The term "excluding any water" means, hence, that any water added to the resin formulation, for example to make an emulsion for making it easier to supply the resin to the wood fiber, is disregarded when calculating the "wt % of resin". In other words, the "wt % of resin" refers to the amount of "water free" resin. The above noted resin contents have been found to provide a strong HDF board, without undue cost, that has good resistance to humid environments.

Preferably the HDF board has a density of 850-1050 kg/m3. These densities have been found to provide a strong board suitable for producing hollow boards that are strong and have a low weight.

Preferably the HDF board has a thickness of 0.5-6 mm, more preferably 1-3.5 mm. These thicknesses have been found suitable for manufacturing a hollow board that is strong and has a low weight, and is still resistant to humid environments.

More preferably, the HDF board has a thickness of 1.0 to 2.4 mm, even more preferred a thickness of 1.5 to 2.2 mm, and still more preferably a thickness of about 2.0 mm. Such thicknesses provide for manufacturing a hollow boards that has an even more beneficial relation between high strength and low weight.

Preferably the HDF board comprises at least 50 wt %, more preferably at least 80 wt %, of dry wood fibers. While the HDF board may comprise other components, for example scrap plastics, the HDF board becomes stronger, and its behavior more predictable the more wood fibers it comprises. This is beneficial for the strength and humidity resistance of the hollow board.

At least one distance element may be glued to the first and second main surface layers using a hotmelt glue, preferably a polyurethane based reactive hotmelt glue.

Preferably all distance elements are made from HDF boards comprising wood particles bonded by a resin including an isocyanate component. When all distance elements of the hollow board are made from this material the hollow board obtains predictable properties, and very good resistance to humid environments.

BRIEF DESCRIPTION OF THE DRAWINGS

FIGS. 4a-7 illustrate enlarged details of the board in FIG. 2.

FIG. 8 shows schematically a cross section through a connection between a main surface layer and an HDF board strip.

DETAILED DESCRIPTION

Figure 1:
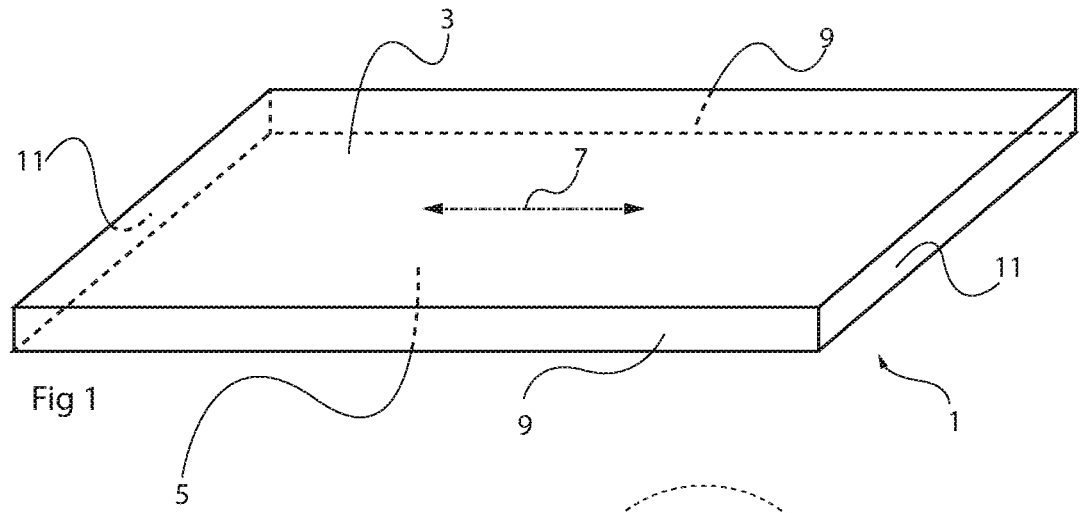
FIG. 1 illustrates schematically in perspective a board that can be used as a furniture component.

The present disclosure relates to a hollow board that can be used as a furniture component. Typically, the board can make up a tabletop, a shelf, a panel in a kitchen cabinet, a door, etc. Many other applications exist. FIG. 1 illustrates schematically in perspective such a hollow board 1. The hollow board comprises a first 3 and a second 5 main surface layer, and generally makes up a flat rectangular cuboid, even though deviations from rectangular shapes, e.g. a parallelepiped could be conceivable. The main surface layers may be quadratic or may as illustrated be elongated having a main direction of extension 7 in which the board has its largest dimension.

In the flat, rectangular cuboid, the first and second main surface layers may in most cases be interconnected at their four edges by edge surface layers 9, 11, although it could be conceivable in some applications to forego from using one or more of the edge surface layers, leaving an opening between the main surface layers at those locations. In most cases, the main surface layers make up most of the outer surface area of the board.

The board is hollow meaning that a lot of air is enclosed therein, or in principle another gaseous medium. This provides a much lighter board as compared to a solid one. Still, a reasonable bending stiffness can be achieved as the mutual separation of the main surface layers 3, 5 provides an increased second moment of area, as compared to if the main surface layers were not separated.

In order to provide structural stability, distance elements are provided, not only at the edges of the board, but spread out in the space between the main surfaces layers of the board, as will be discussed. Thus, there is provided a plurality of distance elements connecting the first 3 and second 5 main surface layers and maintaining a predetermined distance there between.

In the present disclosure, the main surface layers 3, 5 as well as at least some distance members comprise a fiberboard having a density of at least 800 kg/m$^3$, also called high density fiber board or HDF board.

Figure 3:
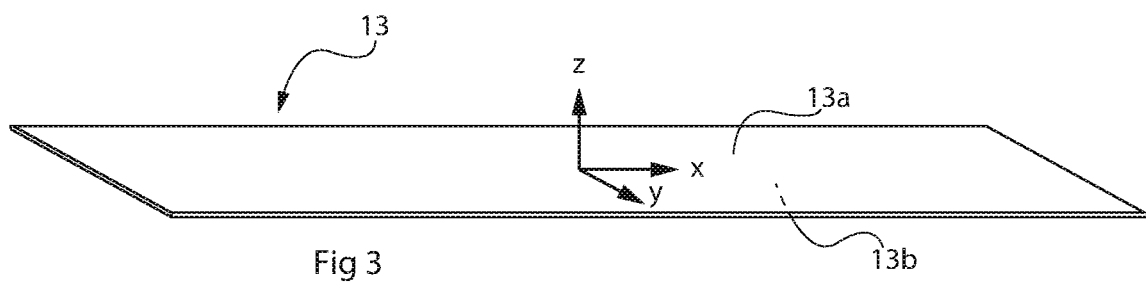
FIG. 3 illustrates schematically a HDF board according to the present disclosure.

FIG. 3 illustrates schematically a HDF board 13 according to the present disclosure. The HDF board 13 is produced by mixing wood fibers/particles such as chips or saw dust with a resin at a raised temperature. The mixture is pressed in the illustrated z-direction at a pressure of several MPa while the resin cures. The pressing of the board 13 forms opposite pressed large faces 13a, 13b that may be smooth, as a result of the pressing. The finished product will have very uniform properties over its entire surface.

In the present disclosure, the HDF board material may be about 2.0 mm thick, or within the range 1.0 to 2.4 mm, or more preferred within 1.5 to 2.2 mm.

Even though the HDF board may be used on its own, it may as well be laminated with other materials. For instance, the HDF board surfaces that will make up the outer surface of the hollow board may be laminated with a decorative foil, such as a polypropylene foil or polyolefin foil or another suitable foil that provide a desired property such as being hydrophobic. Veneer is another possible option.

"HDF board" as used in the current application means a fiberboard material having a density of at least 800 kg/m$^3$. According to a preferred embodiment the HDF board has a density of 850-1050 kg/m$^3$.

In many cases, conventional HDF boards as well as medium-density fiber, MDF, boards have been produced using a urea formaldehyde composition resin.

In the present disclosure a resin comprising an isocyanate component has been found to provide useful properties for a hollow board. It has been found that a HDF board produced with this resin has a lower hygroscopic expansion than has a board produced with a urea formaldehyde composition. This is an important advantage if the product for instance is produced under conditions with low temperatures and low humidity, and is subsequently used under conditions with high temperatures and high humidity. In a case where a significant swelling takes place it is likely for instance that a laminated foil on an edge surface cracks, as such a foil, particularly if made in a plastic material, itself does not expand substantially due to the increased humidity and temperature. Further, in some cases, the swelling may render the board useless, for instance if it does not longer fit together with another component that is not affected in the same way. Still further a HDF board produced with a resin comprising an isocyanate component has also been found to have a higher Modulus of Elasticity at high relative humidity, compared to prior art HDF boards.

More particularly, the isocyanate component may comprise polymethylene polyphenylene isocyanate (also called Isocyanic acid, Polymethylenepolyphenylene ester) and/or methylene diphenyl di-isocyanate, MDI. In case the isocyanate component of the resin comprises methylene diphenyl di-isocyanate then it is preferably the 4,4' isomer thereof (4,4'-methylene diphenyl di-isocyanate). Working examples involving the above referenced isocyanate components will be described hereinafter.

Figure 2:
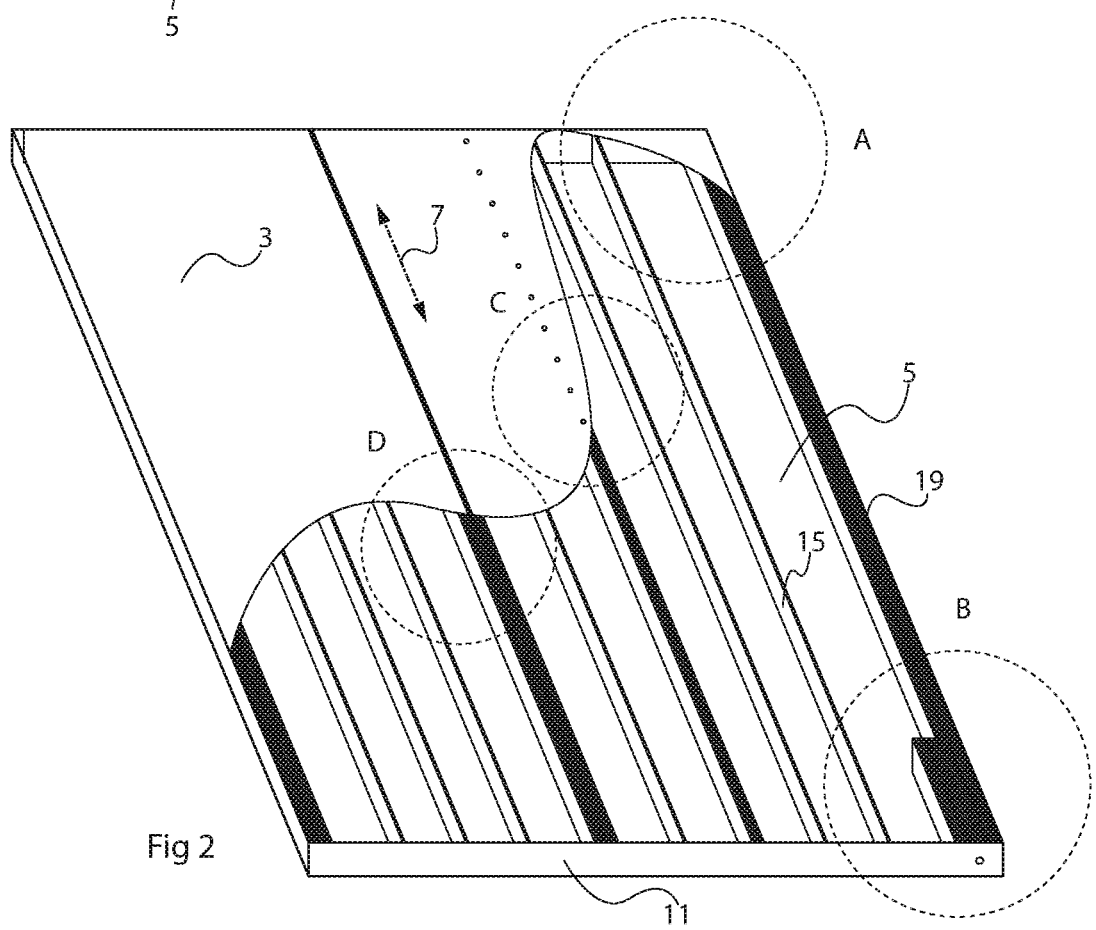
FIG. 2 shows in perspective a partial cut-out of a hollow board according to the present disclosure.

Details of an example of a structure according to the present disclosure will now be described with reference to FIG. 2 showing a hollow board with one main surface layer partially cut away, and FIGS. 4a-8 showing enlarged details of FIG. 2. FIG. 4a shows enlarged the detail A in FIG. 2.

A plurality of distance elements 14 may be distributed in a space 16 formed between the main surface layers 3, 5. Those distance elements may include, as shown in FIG. 4a, an elongate HDF board strip 15 produced as mentioned above. This strip 15 has a width corresponding to the distance between the main surface layers 3, 5, and is oriented standing on its edge such that its longitudinal edges 17 interconnect the first and second main surface layers 3, 5 such that the space 16 is formed between them. The HDF board strip 15 extends in a plane perpendicular to the planes of the first and second main surface layers, and its longitudinal edges 17 are glued to the main surface layers 3, 5. This may be achieved by e.g. applying a layer of glue to the inner surfaces of the first and second main surface layers 3, 5. A polyurethane based reactive hotmelt glue, such as RAP IDEX® HL 9554 F, available from H. B. Fuller Europe GmbH, Zurich, CH, may be used to this end.

While it would be possible to use a wider HDF board strip that is inclined with respect to the direction perpendicular to the planes of the first and second surface layers, the perpendicular configuration is structurally preferred. By gluing the HDF board strip such that it extends in a plane perpendicular to the planes of main surface layers, a local I-beam is formed where the HDF board strip constitutes the beam web and the main surface layers constitutes the beam flanges. This configuration provides significant bending stiffness about an axis that is parallel to the plane of the main surface layers and perpendicular to the direction in which the HDF board strip extends.

When, as illustrated in FIG. 1, the hollow board has a longitudinal direction 7 of extension, the HDF board strip 15 may run straight and in parallel with this direction 7. This allows the board to take up a greater load, for instance if used as a bookshelf. It may be preferable to let the HDF board strip extend along the full length of the hollow board, from one short edge 11 to the other, and to glue the ends of the strip to the board making up those short edges. However, this is not necessary to obtain an improved bending stiffness. For instance, an 80% extension of the length of the board may be enough for some applications. A plurality of HDF board strips 15 may be used spaced apart at even distances over the surface.

Another advantage of arranging an HDF board strip 15 in this way is that most of the hygroscopic expansion that may take place, despite the choice of resin, will take place in what was the z-direction of the HDF board 13, as illustrated in FIG. 3, from which the HDF board strip 15 was derived. This is due to the board 13 being pressed in this direction during production. Any hygroscopic expansion of the HDF board strip taking place in what was the orthogonal x- and y-directions of the HDF board 13, see FIG. 3, from which the HDF board strip 15 was derived will most likely be negligible in comparison. This means that the HDF board strip 15 illustrated in FIG. 4a can be allowed to expand almost without affecting the hollow board at all, because any such expansion of the board strip 15, occurring in the z-direction of the original HDF board 13, will occur in an expansion direction ED being parallel to the plane of the surface layers 3, 5, meaning that the expansion will occur in the hollow space available between adjacent distance elements 14. FIG. 4b illustrates this preferred arrangement of the HDF board strip 15, as seen in cross-section, in which the longitudinal edges 17, that are to be glued to the main surface layers 3, 5, are cut edges, with a degree of roughness caused by cutting the board strip 15 from a large board, such as the board 13 illustrated in FIG. 3, while the side faces/edges 18 of the board strip 15 are surfaces formed already in the HDF board forming process, i.e. the side faces/edges 18 originate from the pressed large surfaces 13a, 13b of the board 13 illustrated in FIG. 3, and are as such more smooth than the longitudinal edges 17. The cutting of the strips 15 from the large board 13 could be made by means of a saw, a knife arrangement or any other suitable means.

There may also be provided as distance elements stacks 19 comprising glued HDF board strips 15, which may be glued together using the same glue as is used to attach the single strips 15 to the main surface layers 3, 5. The stack 19 is oriented in between the first and second surface layers such that individual board strips in the stack interconnect the first and second surface layers, i.e. the individual layers in the stack are oriented in the same way as the single strips. Such stacks 19 form laths that provide additional strength where needed. As shown in FIG. 2 this may be useful at side edges of the hollow board and at other locations where the hollow board need be connected to other components as will be discussed.

FIG. 5 shows enlarged the detail B in FIG. 2. A block in the form of a short stack 21 of HDF board strips may as shown be arranged to adjoin an edge 11 of the board. The short stack 21 may as illustrated be glued to another stack 19, and is used to provide basis for a connector element, in the illustrated case a hole 23 for a screw or the like. The short stack 21 is therefore only needed in the vicinity of the location of the connector 23. In an alternative embodiment, a connector 23 is located at an arbitrary position in a main surface layer 3, 5, for example to support a shelf of a book shelf or to support a handle of a door. If so, the short stack is only needed at that location, and does not need to adjoin an edge. Preferably the short stack 21 may have a length L extending less than 20% of the total length of the board in the extension direction of the stack strips, or in any case the short stack 21 extending less than half of the total length of the board. Such a short stack 21 therefore adds only little extra weight and still may provide a useful additional function. In general, the stack 19, 21 width W, as seen perpendicular to the extension direction of the stack strips of the stack 19, 21, may preferably extend less than 20% of the total width of the board to save weight.

As alternative to, or in combination with, a block having the form of a short stack 21 made from glued together HDF board strips, a block may also be made from other materials. For example, a block may be made from plastic or metal, and may be located between the surface layers 3, 5 for the purpose of providing various functionalities, for example as will be described hereinafter.

Connector elements may also be added in the main surface layers. FIG. 6 shows enlarged the detail C in FIG. 2. Here connector elements in the form of drilled holes 25 are provided in the main surface layer 3 at a location where a stack 19 of glued HDF board strips is provided beneath the main surface layer 3. Such holes 25 may for instance be used to fit plugs or screws for connecting the hollow board to another element. Another example is illustrated in FIG. 7 showing enlarged the detail D in FIG. 2. Here a connector element in the form of a groove 27 is provided in the main surface layer 3 at a location where a stack 19 of glued HDF board strips is provided beneath the main surface layer 3. In such a groove 25, a HDF boar may be slid in, for instance.

FIG. 8 shows a cross section through a connection between an HDF board strip 15 and a main surface layer 3. As illustrated, the main surface layer 3 comprises a main surface layer HDF board 29 with a main surface layer foil 31 laminated thereon to present the outer surface 35 of the main surface layer 3. A glue layer 33 is provided on the inner surface 37 of the main surface layer 3, and adheres to the HDF board strip 15, at least to the strip edge 17 thereof. The glue layer 33 is thus applied just before the board strips 15 are assembled with the main surface layer 3.

Example 1

An HDF board was produced in the following manner: Wood based fibers having an average length of about 5-20 mm and an average diameter of about 0.05-0.3 mm were formed by pressing, and refining wood chips and then drying the resulting fibers according to normal HDF production procedures. The wood fibers were mixed with a resin called I-BOND® MDF EM 4330, which is available from Huntsman Holland B V, Botlek-Rotterdam, Netherlands. This resin comprises, as a major active ingredient, Polymethylene polyphenylene isocyanate (CAS: 9016-87-9) (sometimes also referred also to as Isocyanic acid, Polymethylenepolyphenylene ester). The resulting wood fiber mixture comprised about 5.5 wt % moisture, 4.5 wt % resin, excluding any water, and the remaining part, i.e. 90 wt %, was dry wood fibers. This wood fiber mixture was used to form a fiber mat of 12 mm thickness, which was introduced into an HDF board press. The fiber mat was, during a period of about 3 seconds, exposed to a high pressure treatment which involved exposing the fiber mat to a pressure that increased up to 4 $N/mm^2$ and that was then reduced again. The temperature was about 200° C. during this initial high pressure treatment. After the high pressure treatment the pressure was about 0.4 $N/mm^2$ and this pressure was maintained for about 5 seconds, combined with a temperature of about 160° C. Then pressure was increased to about 1.5 $N/mm^2$, temperature was maintained at about 160° C., and this final pressing was performed during about 9 seconds. In total the pressing occurred during 3+5+9=17 seconds, and the resulting HDF board had a thickness of about 2 mm, a density of 940 $kg/m^3$ and a moisture content of about 4 wt % after pressing.

Example 2

Wood fibers were prepared in a similar manner as in Example 1. The wood fibers were mixed with a resin called I-BOND® MDF PM 4390 available from Huntsman Holland B V, Botlek-Rotterdam, Netherlands. This resin comprises, as major active ingredients, Polymethylene polyphenylene isocyanate (CAS: 9016-87-9), (sometimes also referred also to as Isocyanic acid, Polymethylenepolyphenylene ester), and 4,4'-Methylenediphenyl diisocyanate (CAS: 101-68-8). The resulting wood fiber mixture comprised about 5.5 wt % moisture, 4.5 wt % resin, excluding any water, and the remaining part, i.e. 90 wt %, dry wood fibers. This wood fiber mixture was used to form a fiber mat of 12 mm thickness, which was introduced into an HDF board press. The fiber mat was pressed following the same sequence as described above for Example 1. The resulting HDF board had a thickness of about 2 mm, a density of 940 $kg/m^3$ and a moisture content of about 4 wt % after pressing.

Comparative Example

The comparative example HDF board was prepared in a similar manner as Examples 1 and 2, with the difference that the resin used was a commercially available Melamine Urea Formaldehyde (MUF). A wood fiber mixture comprised about 8 wt % moisture, 10 wt % resin and the remaining part, i.e. 82 wt %, dry wood fibers. This wood fiber mixture was used to form a fiber mat of 12 mm thickness, which was introduced into an HDF board press in which an HDF board was formed with a thickness of about 2 mm, a density of 940 kg/m$^3$ and a moisture content of about 4 wt % after pressing.

Results

The HDF boards produced according to the above techniques were exposed to different degrees of humidity and were then tested for modulus of elasticity (MoE) according to EN310. Table 1 below presents the test results. The column to the right in table 1 presents for each example the Modulus of Elasticity at 90% relative humidity divided by the Modulus of Elasticity at 60% relative humidity. The closer to 1 that this value is the less is the board affected by humidity:

TABLE 1

| Modulus of Elasticity (MoE), (N/mm$^2$), at different relative Humidity | | | | | |
|---|---|---|---|---|---|
| Relative Humidity | 60% | 70% | 80% | 90% | MoE at 90%/ MoE at 60% |
| Example 1 | 5700 | 5200 | 4700 | 3200 | 0.56 |
| Example 2 | 4800 | 4500 | 4000 | 3200 | 0.67 |
| Comparative Example | 5200 | 4300 | 2900 | 2200 | 0.42 |

As can be seen from table 1 the HDF board of the Comparative Example is heavily affected at high relative humidity. The HDF-boards of Examples 1 and 2 on the other hand resists humidity much better and at 90% relative humidity still have substantially more than 50% of their Modulus of Elasticity at 60% relative humidity.

The present disclosure is not restricted to the above examples, and may be varied and altered in different ways within the scope of the appended claims. For example, it has been described hereinabove that all distance elements 14, 19 are made from HDF boards comprising wood particles bonded by a resin including an isocyanate component. While this is a preferred embodiment, it is in some applications possible to use some distance elements made from another material. For example, some of the distance elements could be made of MDF, having a lower density than HDF. MDF would have a density of less than 800 kg/m$^3$, more typically a density of 600-780 kg/m3. In such an embodiment at least the distance elements located close to the edges of the hollow board are preferably made from HDF, while the central distance elements may be made from MDF, or another material, since the hollow board is somewhat less sensitive to humidity induced swelling at its central portions.

The invention claimed is:

1. Hollow board comprising first and second main surface layers and a plurality of distance elements connecting the first and second main surface layers and maintaining a predetermined distance there between, wherein:
    (i) each main surface layer including at least a layer of board having a density of at least 800 kg/m$^3$; and
    (ii) a plurality of distance elements distributed in a space between the main surface layers, wherein the first and second main surface layers and at least one side edge surface of the hollow board are made from a single piece of board having a density of at least 800 kg/m$^3$.

2. The hollow board according to claim 1, wherein at least one of the main surface layers comprises wood particles.

3. The hollow board according to claim 2, wherein the wood particles of the at least one of the main surface layers are bonded by a resin.

4. The hollow board according to claim 1, wherein at least some of the plurality of distance elements comprise at least one elongate board strip and are oriented so that longitudinal edges of the elongate board strip interconnect the first and second main surface layers.

5. The hollow board according to claim 4, wherein the at least one elongate board strip comprise wood particles.

6. The hollow board according to claim 5, wherein the wood particles of the elongate board strip are bonded by a resin.

7. The hollow board according to claim 4, wherein the at least one elongate board strip extends in a plane perpendicular to a plane of the first and second main surface layers.

8. The hollow board according to claim 4, wherein the hollow board has a main direction of extension and the at least one elongate board strip has an elongate direction being parallel with the main direction of extension.

9. The hollow board according to claim 4, wherein longitudinal edges of the at least one board strip are longitudinal edges that interconnect the first and second main surface layers, and are cut edges formed by cutting a strip from a board, and wherein side edges of the at least one board strip are perpendicular to the longitudinal edges and have a more smooth surface than the longitudinal edges.

10. The hollow board according to claim 8, wherein the at least one elongate board strip extends along at least 80% of the length of the board in the main direction of extension.

11. The hollow board according to claim 1, wherein the at least one of the plurality of distance elements comprises a stack of glued together board strips comprising 3-10 individual board strips.

12. The hollow board according to claim 11, wherein the stack adjoins a side edge of the hollow board.

13. The hollow board according to claim 1, wherein at least one connector element is machined in the hollow board at the location of a block placed between the surface layers, the at least one connector element extending at least partly into the block.

14. The hollow board according to claim 13, wherein the at least one block has a length (L) constituting less than 20% of the total length of the hollow board.

15. The hollow board according to claim 11, wherein the stack of board strips are glued together using a polyurethane based reactive hotmelt glue.

16. The hollow board according to claim 1, wherein the plurality of distance elements includes both at least one stack of glued together board strips and at least one distance element comprising a single board strip having a density of at least 800 kg/m$^3$, the latter being spaced apart from said at least one stack.

17. The hollow board according to claim 1, wherein at least one of the plurality of distance element is glued to the first and second main surface layers using a hotmelt glue.

18. The hollow board according to claim 13, wherein at least one of the blocks is a stack of glued together board strips.

19. The hollow board according to claim 1, wherein the board has a density of 850-1050 kg/m³, a thickness of 0.5-6 mm, and comprises at least 50 wt % of dry wood fibers.

20. The hollow board according to claim 1, wherein the first and second main surface layers are folded from a single piece of board.

21. The hollow board according to claim 1, further comprising blocks located between the first and second main surface layers.

22. The hollow board according to claim 21, further comprising at least one connector element machined in the hollow board at a location of one of the blocks.

23. Hollow board comprising first and second main surface layers and a plurality of distance elements connecting the first and second main surface layers and maintaining a predetermined distance there between, wherein:
  (i) each main surface layer including at least a layer of board; and
  (ii) a plurality of distance elements distributed in a space between the main surface layers, at least some of said distance elements being made from a board material having a density of at least 800 kg/m³, wherein the first and second main surface layers and at least one side edge surface of the hollow board are made from a single piece of board.

* * * * *